United States Patent [19]
Hutchings et al.

[11] Patent Number: 6,102,995
[45] Date of Patent: Aug. 15, 2000

[54] HIGH PERFORMANCE INTUMESCENT SYSTEM FOR IMPARTING HEAT/FLAME RESISTANCE TO THERMALLY UNSTABLE SUBSTRATES

[75] Inventors: David A. Hutchings, Tucker; Shahid P. Qureshi, Duluth; Millard E. Foucht, Stone Mountain; Richard D. Sampson, Decatur; Ted M. McVay, Lawrenceville, all of Ga.

[73] Assignee: Georgia-Pacific Resins, Inc., Atlanta, Ga.

[21] Appl. No.: 09/035,898

[22] Filed: Mar. 6, 1998

[51] Int. Cl.⁷ .................. B32B 5/16; C09D 5/18
[52] U.S. Cl. .................... 106/18.15; 106/18.18; 106/18.21; 106/18.26; 428/329; 428/920
[58] Field of Search .................. 428/323, 403, 428/329, 920; 106/18.18, 18.15, 18.21, 18.26

[56] References Cited

U.S. PATENT DOCUMENTS

| | | |
|---|---|---|
| 3,014,910 | 12/1961 | Birum . |
| 3,014,944 | 12/1961 | Birum . |
| 3,014,945 | 12/1961 | Birum . |
| 3,014,946 | 12/1961 | Birum . |
| 3,014,947 | 12/1961 | Birum . |
| 3,014,948 | 12/1961 | Birum . |
| 3,014,950 | 12/1961 | Birum . |
| 3,014,951 | 12/1961 | Birum . |
| 3,014,954 | 12/1961 | Birum . |
| 3,014,956 | 12/1961 | Birum . |
| 3,029,271 | 4/1962 | Birum . |
| 3,058,941 | 10/1962 | Birum . |
| 3,160,650 | 12/1964 | Birum et al. . |
| 4,206,133 | 6/1980 | Joyce, III et al. . |
| 4,283,501 | 8/1981 | Brady et al. . |
| 4,596,881 | 6/1986 | Greco et al. ............................ 556/171 |
| 4,965,296 | 10/1990 | Hastings ................................ 523/179 |
| 4,992,481 | 2/1991 | Von Bonin et al. ...................... 521/54 |
| 5,053,077 | 10/1991 | Crompton et al. .................. 106/18.16 |
| 5,094,780 | 3/1992 | von Bonin . |
| 5,139,875 | 8/1992 | Metzemacher et al. . |
| 5,173,515 | 12/1992 | von Bonin et al. .................... 521/103 |
| 5,182,049 | 1/1993 | Von Bonin ......................... 252/378 R |
| 5,194,198 | 3/1993 | Von Bonin et al. ...................... 264/42 |
| 5,258,216 | 11/1993 | Von Bonin et al. .................... 428/102 |
| 5,562,870 | 10/1996 | Bonin ........................................ 264/8 |
| 5,925,700 | 7/1999 | Imahashi ................................ 524/397 |

FOREIGN PATENT DOCUMENTS

| | | |
|---|---|---|
| 41 35 678 A1 | 5/1993 | Germany . |
| 2 012 296 | 7/1979 | United Kingdom . |
| 1601884 | 11/1981 | United Kingdom . |
| 2 151 237 | 7/1985 | United Kingdom . |

*Primary Examiner*—H. Thi Le
*Attorney, Agent, or Firm*—Banner & Witcoff, Ltd.

[57] ABSTRACT

An intumescent composition comprising the dried product of a composition containing as essential components (1) the reaction product of aluminum oxide or aluminum hydroxide hydrate and an organic amine phosphate or a salt thereof, and (2) expandable graphite flake.

24 Claims, 1 Drawing Sheet

HIGH PERFORMANCE INTUMESCENT SYSTEM FOR IMPARTING HEAT/FLAME RESISTANCE TO THERMALLY UNSTABLE SUBSTRATES

BACKGROUND OF THE INVENTION

1. Field of the Invention

This invention broadly relates to a composition useful for imparting fire resistance to a variety of substrates, particularly for materials used in the building and construction industry. More particularly, this invention provides a composition containing as essential components (1) the reaction product of aluminum oxide or aluminum hydroxide hydrate and an organic amine phosphate or salt thereof, for example aluminum hydroxide hydrate and triethanolamine triphosphate, and (2) expandable graphite flake. After the composition is dried, it acts as an intumescent and imparts fire resistance to substrates treated with the composition, particularly gypsum substrates such as wallboard.

2. Description of Related Art

Intumescent coatings are commonly applied to the surface of construction materials. Such coatings serve, for example, to prevent the spread of fire. Intumescent coatings are also applied to the surface of other flammable substrates, to reduce their flammability. U.S. Pat. No. 4,198,328 for example, describes an intumescent paint which includes a source of phosphoric acid, a carbon source and an expanding agent. These components are bound together by a conventional polymeric binder. Binders have included acrylic styrene or vinyl toluene copolymer, a styrene or vinyl toluene-butadiene-copolymer, a styrene or vinyltoluene-acrylonitrile-copolymer polyurethane resins, alkyl resins and the like. Alternatively, polyvinyl alcohol, polyvinyl acetate, polyvinyl butyral, urea or melamine-formaldehyde resins and vinyl chloride-vinylidene chloride copolymers have been used. The use of epoxy resins in combination with various amino-functional curing agents also is known. In all of these formulations, chlorinated paraffins or optionally chlorinated phosphate esters may be employed as plasticizers.

Other intumescent systems are also known. GB-A-2,151,237 discloses water-insoluble formulations which contain chlorinated polymers, novolak resin and chlorinated or phosphorylated plasticizers. GB-A-2,012,296 describes a three-layer intumescent paint which uses as the intermediate layer formulations which contain expandable graphite, hydrated alumina and binder systems based on halogenated elastomers and alkyl phenol-formaldehyde resins. The binder, in concert with a silicate top coating, functions to prevent the expanded graphite from crumbling and cracking. GB-A-1,604,908 mentions products with vermiculite and inorganic fibers as filler as well as elastomeric binders and clay.

Intumescent, fire resistant compositions act by forming an expanded, insulating layer of a hardly flammable material under the action of heat. The expanded layer shields the substrate from oxygen and/or from overheating and thereby prevents or delays the spread of flame, and prevents or at least delays reductions in the mechanical and static properties of structural supporting elements caused by heat.

A greater expansion (intumescence) produces thicker protective layers, but at the same time the thicker layers, generally due to their reduced mechanical stability, often are more easily detached from the substrate thus becoming less effective.

Conventional intumescent systems consist of a binder of the above type including urea-formaldehyde resins and melamine-formaldehyde resins, a char or carbon skeleton forming substance (typically referred to as "carbonific"), an expanding agent (typically referred to as "spumific") and an acid forming substance as essential components. As carbonifics, organic polyhydroxy compounds such as pentaerythritol, dipentaerythritol, tripentaerythritol, starch and sugars have been employed. Examples of spumifics are nitrogen-containing compounds such as melamine, melamine salts, melamine derivatives, urea, dicyandiamide and guanidine. The spumific effects the formation of a foamed (intumescent) layer by emission of an inert gas. Acid forming substances are usually an aminophosphate, mainly ammonium phosphates and amine phosphates, preferably ammonium polyphosphate, and melamine phosphate, have found use. Examples of further additives are inorganic fibers which serve to increase the mechanical strength of the intumescent layer and/or to prevent flow or movement thereof, and metal oxides which act as smoke suppressants. Typical examples of such compositions can be found in U.S. Pat. Nos. 4,442,157, 4,638,538, and 3,562,197, and GB-A-755,551.

Upon exposure to a flame, an intumescent composition swells up with the formation of a foam which repels the action of the fire. Many intumescence compositions, used, for example, as fire-preventive coatings or fire-preventive cements, on exposure to a flame form carbonized foams, because they contain, as intumescence media, carbohydrates or phenolic, polyurethane or melamine resins in combination with a phosphoric acid donor. Inorganic materials, for example alkali metal silicates containing water, can also foam on exposure to a flame, and also are employed for the purposes of fire prevention. However, since these silicates are sensitive to moisture and/or $CO_2$, they can only be used to a limited extent as intumescence media.

Most organic-compound based intumescence compositions contain carbonisable compounds in combination with phosphorus compounds which act as the intumescent media. The carbonization foams formed on exposure to a flame have, however, only a low mechanical strength, and thus provide only a low resistance to flame erosion and are degradable by oxidation. Organic fire-preventive materials of this type can also contain various forms of aluminum hydroxide, the functions of which are to assist the foaming of the carbonization melt by splitting off water under the influence of heat. This process further provides extended fire performance by consuming heat.

The carbonization of organic melts is promoted by phosphorus compounds which liberate phosphoric acid. As noted above, ammonium phosphates are therefore frequently employed as phosphoric acid donors, but their good solubility in water is a disadvantage since the acid can leach out of the intumescent coating and also degrade the substrate.

There is, however, still a need for intumescence compositions which are more slowly degradable by oxidation under prolonged exposure to a flame front, which are insensitive towards air, moisture and $CO_2$ in their performance as a coating, which upon exposure to a flame become effective even at temperatures below 300° C., and which form as far as possible an intumescent foam having good mechanical stability and adhesion to the substrate.

Accordingly it is an object of the present invention to provide a composition having integrated intumescent properties which avoids or at least alleviates disadvantages of conventional prior art intumescent systems described above.

Compliance with various fire resistance testing methods is an important consideration in developing fire resistant compositions because many regulatory agencies and building codes rely on these tests in determining the acceptance of building materials used in various applications. Insurance rates may also be affected by compliance with fire resistance testing methods.

U.S. Patent No. 5,182,049 describes that mixtures of aluminum oxide or hydroxide-based minerals with a tribasic phosphoric acid can form aluminum phosphate solutions, which are fluid at modest temperatures, at solids levels in the 50% range. These fluids can be subsequently treated with amines or hydroxyamines such as ethanol amine, diethanol amine, ethylene diamine, etc, to produce gelable systems, which can upon drying and grinding, be used as an ingredient for intumescent coatings. These materials, when combined with heat expandable graphite produce, on subjection to heat, intumescent coatings, which are heat resistant, oxidative resistant, and resilient. The aluminum phosphate is used as a pre-reaction product as a basis for producing the intumescent system.

SUMMARY OF THE INVENTION

In a first aspect, the present invention is directed to an intumescent composition comprising the dried product of a composition containing as essential components (1) the reaction product of aluminum oxide or aluminum hydroxide hydrate and an organic amine phosphate or salt thereof, and (2) expandable graphite flake.

The invention also relates to an aqueous composition suitable for imparting fire resistance to a substrate, such as by coating or impregnating the substrate with a nascent intumescent composition, said aqueous composition comprising as essential components (1) the reaction product of aluminum oxide or aluminum hydroxide hydrate and an organic amine phosphate or a salt thereof, and (2) expandable graphite flake.

In accordance with yet another aspect of the invention, a substrate is rendered fire resistant by treating said substrate with an aqueous composition comprising as essential components (1) the reaction product of aluminum oxide or aluminum hydroxide hydrate and an organic amine phosphate or a salt thereof, and (2) expandable graphite flake. The resultant fire resistant article, comprises the substrate coated or impregnated with the dried composition containing (1) the reaction product of aluminum oxide or aluminum hydroxide hydrate and an organic amine phosphate or a salt thereof, and (2) expandable graphite flake.

DETAILED DESCRIPTION OF THE INVENTION

In accordance with the present invention, a intumescent composition is prepared by drying an aqueous composition containing (1) the reaction product of aluminum oxide or aluminum hydroxide hydrate and an organic amine phosphate or salt thereof, and (2) expandable graphite flake. The composition constitutes a char-forming, phosphorus-containing intumescent which serves to hold the expanded graphite flakes in contact with a substrate under conditions of thermal stress such that the intumescent coating is maintained as a barrier against the spread of fire.

The present intumescent system is used as a coating on substrates such as gypsum as used in the manufacture of gypsum wallboard and similar products. The materials can form structures having utility, such as gypsum wallboard, which maintain structural integrity and inherent fire retardancy at low temperatures. However, fire performance of these material is seriously hindered through prolonged exposure to high temperature heat sources. Under these conditions, waters of hydration necessary to maintain an intact structure become depleted and the mechanical properties of the gypsum article degrade. As a consequence, loss of mechanical performance is observed, which leads to loss of fire performance.

When such gypsum materials are coated with an intumescent barrier system of the present invention, flame fronts cause the intumescent material to expand and create an insulation layer on the surface of the gypsum substrate. This intumescent insulation layer prevents heating of substrate to the level where waters of hydration, critical to mechanical performance, are lost. As a result, the gypsum article enjoys a much greater level of fire resistance.

General intumescents of which expandable graphite and phosphate esters/sugar/melamine intumescents are members do not enjoy high temperature thermal oxidative stability. As a consequence, in an oxidizing flame environment, fire resistant performance enjoyed through the use of an intumescent is short-lived since the carbonaceous intumescent is completely consumed through oxidative degradation. The present invention provides an unexpectedly improved result since the intumescent formed in this invention provides protection to the gypsum substrate for a period of time far in excess of that seen with normal carbon based intumescents. Indeed the degree of protection is sufficient to allow the treated structure to pass severe tests necessary to qualify fire retardant materials for applications such as fire doors, etc.

The present invention is based on an interaction between the expanding graphite flakes, which form "snake like" structures on exposure to heat, and the intumescent char formed from the intumescent binder formed from the reaction product of a slurry containing aluminum oxide or hydroxide hydrate and an organic amine phosphate. The intumescent char formed from the binder, binds the expanded graphite to the substrate so as to create a composite structure having the mechanical and insulative performance critical to the success of a fire retardant system.

The organic amine phosphate is any suitable organic amine phosphate or salt thereof, preferably triethanolamine triphosphate. Suitable salts include sodium, potassium, and calcium salts such as sodium triethanolaminephosphate, or disodium triethanol amine phosphate. The salt is preferably a sodium salt.

The phosphate provides ester linkages to the aluminum oxide or aluminum hydroxide hydrate. The organic amine phosphate can be prepared from acidic phosphorus compounds. Suitable acidic phosphorus compounds include the known phosphoric acid esters of polyhydroxy compounds (partial phosphate esters), as described in U.S. Pat. No. 5,387,655 (the disclosure of which is incorporated by reference), and certain nitrogen-containing, acidic phosphorus compounds.

The phosphoric acid esters can be prepared by reacting a polyol or a mixture of polyols, such as pentaerythritol, glycerol, trimethylol propane and the like, with a polyphosphoric acid. The reaction is conducted to a constant acid value, upon the controlled addition of the phosphoric acid to the polyol(s) under a reduced pressure, with vigorous agitation and with control of the temperature (e.g., 100° to 150° C.).

Suitable nitrogen-containing acidic phosphorus compounds contain one or more moieties of the following formula:

where R is selected from a $C_1$ to $C_6$ alkylene radical, a $C_3$ to $C_7$ cycloalkylene radical, an arylene radical and a divalent radical of the formula:

where x and z are integers of 1 to 6, and y is an integer from 0 to 2 and wherein the divalent radical is bonded to the phosphorus atom of said moieties through the terminal oxygen atom.

One preferred class of such nitrogen-containing acidic phosphorus compounds includes compounds of the following formula:

where i is either 0 to 1, R' is selected from the hydrogen, a $C_1$ to $C_6$ alkyl, a $C_1$ to $C_6$ alkoxy, a cycloalkyl, and an aryl, R is selected from a $C_1$ to $C_6$ alkylene radical, a $C_3$ to $C_7$ cycloalkylene radical, an arylene radical and a divalent radical of the formula:

where x and z are integers of 1 to 6, and y is an integer from 0 to 2 and wherein the divalent radical is bonded to the phosphorus atoms of said compound through the terminal oxygen atom.

Another class of nitrogen-containing, acidic phosphorus compounds includes compounds of the formula:

where R" is a divalent organic radical, such as an alkylene group having from 1 to 12 carbon atoms and R has the same meaning noted above.

Yet another class of nitrogen-containing acidic phosphorus compounds has the formula:

where R and R" have the same meanings as above.

One class of such compounds can be prepared by reacting (partially neutralizing) orthophosphoric acid ($H_3PO_4$) with an alkanol amine, and particularly a di- or tri-alkanol amine. Suitable alkanol amines may have the formula:

where i is either 0 or 1, R' is selected from hydrogen, a $C_1$ to $C_6$ alkyl, $C_1$ to $C_6$ alkoxy, a cycloalkyl, and an aryl, x and z are integers of 1 to 6, y is an integer from 0 to 2.

Phosphoric acid equivalents such as pyrophosphoric acid (which is equivalent to 105% orthophosphoric acid), tetraphosphoric acid (which is equivalent to 115% orthophosphoric acid) or phosphorus pentoxide (which is equivalent to 138% orthophosphoric acid) also may be used as the phosphoric acid source.

Such alkanol amines are commercially available and include dimethanolamine, diethanolamine, dipropanolamine, dibutanolamine, trimiethanolamine, triethanolamine, tripropanolamine, tributanolamine and the alkylene oxide adducts of these alkanolamines such as their ethylene oxide and propylene oxide adducts.

Acidic phosphorus compounds prepared in this manner have the following formula:

where the oxygen of the alkylenoxy is bonded to the phosphorus and where x, y and z have the same meaning defined above.

A particularly preferred nitrogen-containing, acidic phosphorus compound is the one prepared by neutralizing orthophosphoric acid with trimethanolamine, triethanolamine, tripropanolamine and the like. These preferred compounds have the formula:

where n is an integer of 1 to 4 and Z is 0 or $CH_2$.

The neutralization adduct of triethanolamine (TEA) and phosphoric acid in an amount of three moles of acid per mole of TEA is known in the art and is commercially available as triethanolamine triphosphate or ATP (Z=O and n=2). For example, ATP is available commercially from P. Chem, Inc., Latexo, Tex. The reaction product is basically considered a triester of TEA and has an acid number of 510–525. ATP has the following formula:

A second class of nitrogen-containing acidic phosphorus compounds useful in the practice of the present invention, generally referred to as phosphonates, can be prepared by reacting phosphorus acid, formaldehyde and ammonia or a primary or secondary amine through a phosphonomethylation reaction among the ammonia or amine, formaldehyde and phosphorus acid. Hydrochloric acid may be added to the reaction mixture to suppress the oxidation of phosphite to phosphate.

A wide variety of phosphanates may be used in carrying out the invention, such as nitrolotri(methylene phosphoric acid) or diethylenetriamine-penta (methylene phosphoric acid). Polyphosphonates, containing at least two N-alkylene-phosphoric acid groups and especially at least two N-methylene-phosphonic acid groups are suitable.

Suitable phosphonic acids (phosphonates) can be prepared by the reaction of ammonia or an amine with formaldehyde and phosphorus acid. A diphosphonic acid of the formula:

where R' is a monovalent organic radical, preferably a substituted or unsubstituted alkyl group having 1 to 6 carbon atoms such as propyl, isopropyl, butyl, hexyl or 2-hydroxyethyl, can be prepared from a primary amine. An example of a tri-phosphonic acid is aminotris(methylene-phosphonic acid) (ATMP) made by reacting ammonia, formaldehyde and phosphorus acid. ATMP has the formula:

ATMP also is commercially available from P Chem, Inc. Examples of tetra-phosphonic acids $R(PO_3H_2)_4$ are the alkaylene diamine tetra(methylene-phosphonic acids) of the formula:

where R" is a divalent organic radical, such as an alkylene group having from 1 to 12 carbon atoms. One example is ethylene diamine tetra(methylene phosphonic acid). Examples of pentaphosphonic acids, $R(PO_3H_2)_5$ are the dialkylene triamine penta(methylene phosphonic acids) of the formula:

For example, such pentaphosphonic acids include diethylene triamine penta(methylene phosphonic acid) of the formula:

and bis hexamethylene triamine penta(methylene phosphonic acid) of the formula:

These nitrogen-containing acidic phosphorus compounds also are commercially available from P Chem as IS-32 and IS-22 respectively.

The organic amine phosphate of the present invention is preferably blended with the aluminum oxide or aluminum hydroxide hydrate in water to form the slurry component of the subject composition. Preferably the hydrates of alumina $Al_2O_3$ have 15 to 50% water. Preferably aluminum hydroxide hydrate is used, more preferably aluminum hydroxide hydrate which has 50-57% $Al_2O_3$ having a general formula $Al(OH)_3 \cdot XH_2O$ obtained from Aldrich Chemical Co. and having a product catalogue identification number 23,918-6. The capability of intimate coreaction between the amine phosphate ester and the alumina component is a requirement to achieve the performance observed with the subject intumescent coating.

The aluminum oxide or aluminum hydroxide hydrate must be able to provide a system which is rapidly coreactive with the organic amine phosphate coreactant. Preferably the alumina hydrate should form a highly dispersed particulate in aqueous media having some colloidal component. In addition, the phosphate hydroxy functionality of the organic amine phosphate form ester linkages with alumina hydrate hydroxyls which give thermoplasticity to the aluminum oxide/hydroxide hydrate-organic amine phosphate binder component allowing it to more effectively bond the expanded graphite "snakes" which form during expansion of the acid-treated graphite flakes.

The homogeneous barrier coating derived from the alumina-amine phosphate component which forms on the expanded graphite flake not only acts as a binder system for the intumescent composite, but also as a barrier system to slow the oxidative degradation of the graphite plates which constitute the microstructure of the expanded graphite. At high temperatures, both the phosphate and the aluminum hydroxy functionalities are capable of bonding with the oxy-functionalities on the graphite plates to minimize the available sites for oxidative attack. Thus, the combined barrier and inhibitor effects possible in the defined system give rise to the much improved oxidative stability of the subject invention.

Use of aluminum oxide and aluminum hydroxide hydrate systems in accordance with the present invention has many advantages. Solubilized aluminum hydroxide hydrates of the type required herein are formed as products and as intermediates in many processes for the preparation of aluminum oxide refractories, fillers, and abrasives. Soluble aluminum hydroxide hydrates and hydrous oxides can be formed by specific treatments of many aluminum-containing minerals. Theoretical aluminum hydroxide can be described by the following formula:

Aluminum is 4-coordinated in most of its compounds. Thus, the $A(OH)_3$ is best described as its dimer.

Due to the electronegativity of the trivalent aluminum ion, its hydroxides are amphoteric, i.e., they can act as both acids and bases.
As an acid:

As a base:

The trivalent aluminum atom can be tetrahedral or octahedral in its compounds depending on ligand substitutions.

Hydroxides or hydrous oxides of this type will also condense to form polymeric, water soluble hydrous oxides in which two hydroxyls have reacted to form an ester (ether) linkage between two aluminum metal ions. Such polymers grow in molecular weight until colloids and eventually precipitates are formed in aqueous solutions.

Precipitated aluminum hydrous oxides can be carefully dried to produce hydrated aluminum oxides which contain very high surface areas and high percentages of available hydroxyls. Such systems can be rendered water soluble or water dispersible by contacting them with either acidic or basic aqueous solutions.

The enhanced water compatibility arises from the generation of ionic sites on the hydrated alumina by either of the >Al—OH amphoteric reactions stated earlier and by cleavage of the >Al—O—Al< linkages by hydrolysis.

In addition, the key reaction that the triethanolamine phosphate (ATP) and its analogues promotes with hydrated alumina systems involves the formation of phosphate amine esters which serve to plasticize, solubilize, and eventually form the desired high temperature intumescent composite with the expanding graphite flake at flame exposure temperatures. The ATP phosphate esters react with available aluminum hydroxides to form >Al—O—P(=O)< linkages which create low temperature bonding sites to set the intumescent system during application to the substrate. Thus, the gelling/setting process is believed due to the reactions of the multi-functional phosphates with available aluminum hydroxyls. At elevated temperatures, aluminum phosphate linkages in combination of the amine phosphate esters create a thermoplastic state or condition which allows for a period of thermoplastic expansion capable of transition to a subsequent thermoset state as the intumescent undergoes exposure to the flame front.

The subject invention shows two unique characteristics not seen in other related compositions:

1) Lower temperature cure (setability) after a satisfactory pot life.
2) A high temperature thermoplastic regime long enough to allow intumescence with rapid thermosettability capable of generating desired hot strength and intumescent durability.

From this description, it can be seen that alumina systems having high levels of free hydroxyls and high surface areas with the ability to disperse well in ATP or similar amine-phosphorous solutions are desirable.

Use of more highly fired aluminum tri-hydrates give very short pot lives after mixing the system components. Unsuitable aluminum oxide/hydroxide systems can lead to a loss in high temperature oxidative resistance and to a general weakening of the intumesced composite formed on exposure to high heat fluxes. They also result in poor intumescent exfoliation and poor relative fire performance.

In a preferred embodiment, aluminum hydroxide hydrate is slurried with triethanolamine triphosphate (ATP) in water. In the slurry, the aluminum hydroxide moiety forms aluminum phosphate linkages, which are in turn linked through the phosphate ester linkages of the ATP. The ATP-aluminum hydroxide hydrate slurry, once combined with the expandable graphite system remains fluid and coatable for a sufficient period of time to allow application to any desirable substrate. The coating undergoes further reaction with loss of water and other volatiles to form an adherent coating. The nature of the coating is related to the types of crosslinks generated from the amine phosphate ester in combination with the aluminum hydroxide hydrate. The system as applied and subsequently cured is stable and capable of demonstrating the desired flame resistance after prolonged exposure to ambient environments. Under conditions where additional weatherability is required, techniques used for generating this performance for normal intumescents may be successfully applied.

Relative proportions of the aluminum oxide or aluminum hydroxide compound and the organic amine phosphate (or salt thereof) are supplied sufficient to cause the binder to form a hardened coating at a desired rate and at a desired temperature. Normally, the organic amine phosphate will be added in an amount of 20 to 100 weight percent based on the weight of the aluminum oxide or aluminum hydroxide hydrate compound, preferably from 30 to 70 weight percent. To facilitate uniform blending, the solution may also contain additional solvents such as ethylene glycol and n-butanol. Generally, the organic amine phosphate is added in an amount to yield a phosphorus content in the ultimately hardened composition of at least about 5% by weight of the coating composition, and particularly at least about 10% by weight. Normally, the phosphorus containing component content of the hardened coating will not exceed about 30% by weight.

The final essential component of the compositions of the present invention is an expandable or swellable graphite, for example a graphite compound which contains expansive molecules chemiabsorbed between the interstitial graphite lattice planes. Most desirable of this class are acids based on halogens, $NO_x$ and/or $SO_x$. Said compositions expand, on heating to a temperature of approximately 150° to 600° C., to 200 to 300 times their initial volume. When the aluminum-ATP binder system is used, the volume of expansion is reduced, but the mechanical property improvement and increased insulation performance resulting from lower diffusion and convection rates give a net gain in the intumescent performance. Mixtures of different types of expandable graphites can also be used. A particularly useful intumescent additive in this regard is Grafoil® or GRAF-GUARD™ graphite flake commercially available from UCAR Carbon Co., Inc.

The expandable graphite is added to the binder in an amount sufficient to provide from about 5 to 50 grams of graphite per square foot of area to be treated with the intumescent composition. Generally providing a composition containing the graphite flake in an amount of from 10 to 40 percent by weight should be suitable.

A suitable solvent may also be added to the composition such as acetone, methanol, ethanol, higher alkanols and diols, alkanoletherpolyols such as diethylene glycol, and higher homologues based on ethylene and propylene oxide.

In addition, other components, such as tall oil fatty acid (TOFA) which is a mixture of $C_{18}$ unsaturated fatty acids (the acids contain 1 and 2 double bonds per fatty acid) and phosphate esters, may be added to modify the interactions between the aluminum and phosphate compounds to give binder systems for graphite intumescent flake which are capable of being thermoset. These components are added in amounts of from 5 to 100 percent of the ATP component. Specific phosphate esters include those derived from pentaerythritol, glycerol, (ethylene, propylene glycol), sorbitol, and other similar polyols by the action of concentrated phosphoric acid and heat, $P_2O_5$, and mixtures of phosphorous oxides having a varying degree of hydration.

In addition, aluminum alkoxides and chelated aluminum alkoxides, such as aluminum acetoacetate-diisopropoxide, can be added which are capable of forming stabilizing species on the graphite surface to inhibit oxidation of the graphite flake sheets which are exposed at the molecular level after intumescent exfoliation. These alkoxides are added in an amount effective to inhibit oxidation of the graphite sheets, generally about 1 to 10 percent based on the graphite component. Said alkoxides can most effectively be employed as a pretreatment of the dry graphite flake under anhydrous conditions with the application of heat. Such a process ensures that aluminum linkages are formed between the reactive surface sites of the graphite and the bulk aluminum component.

It also may be advantageous under certain circumstances to incorporate additional intumescent adjuvants in the composition, e.g., in order to increase the rising rate of the intumescent layer further or to decrease the density thereof. Such intumescent material additives are optionally employed in an amount of up to 200 percent by weight of the graphite flake. Such materials may include polyalcohols, swellable micas, silicates, borates and/or synthetic borosilicates. Such components are usually present in the composition in a minor amount of up to 15% to 30% by weight of the binder solids.

If appropriate, additional binders and the usual fillers can also be used in connection with the present invention. As noted above, such binders may include resinous compositions such as phenol-formaldehyde (PF) in conjunction with appropriate curatives and urea-formaldehyde (UF) resins. Examples of fillers which can be used are chalk, asbestos, metal powders, metal oxides, metal hydroxides, silicates, carbon, powdered rock, mineral fibers, glass, slags, filter dusts and ashes. The fillers optionally can be added in quantities of, for example, 0 to 30% by weight, preferably 0 to 10% by weight (relative to the binder solids).

Of particular note is the role of phenolic resole addition to the intumescent composition to increase weatherability and durability of the composite in its coating function. In the stated application, adherent highly efficient intumescent coatings are produced at high 15–30% resole additions. In contrast, phenolic bonded graphite coatings show poor strength during the intumescent process,. Clearly, the aluminum oxide-amine phosphate components promote incorporation of the phenolic component into a strong adherent fire retardant barrier.

For the subject invention, supplemental phenate phosphate esters derived for the treatment of novolacs with phosphoric acid or its anhydrides ($P_2O_5$) are of particular value. These can be added at 5 to 50 percent of the alumina component.

Conventional pigments may also be added to the compositions according to the present invention, the total amount thereof usually not exceeding 5 to 50%, particularly 10 to 40% by weight of the total weight of the binder solids. As pigments, all substances which are employed in conventional intumescent compositions and which preferably are of mineral (inorganic) nature are suitable. Examples of such pigments are titania and carbon black.

The composition of the present invention has particular use as a composition for coating a variety of substrates for imparting fire resistant characteristics. Thus, the compositions according to the present invention are preferably present in a form suitable for coating and impregnation purposes, for example as an aqueous or water-containing solution or as a dispersion. The water content of the composition depends on the amount and the nature of the components employed, but preferably is not higher than about 80% by weight of the total composition including water. Normally, the total solids content of the aqueous composition is between about 20 and 90% by weight with compositions having a solids content above about 50% and more usually above 60%, depending on the intended application, generally being preferred. As used herein, the solids content of a composition is measured by the weight loss upon heating a small, 1–5 gram, sample of the composition at about 135° C. for about 2 hours.

Compositions according to the present invention are preferably employed for coating articles made of wood, plastic (including plastic composites, and plastic foams), cellulosic materials, rubber, gypsum board and metal, and for the impregnation of glass, KEVLAR, and carbon fibers. The application of the composition may be carried out according to any conventional method, e.g., by spraying, dipping, drawing and brushing. The coating process may optionally be repeated several times. The coating thickness may vary within a wide range, depending on the viscosity of the composition and the substrate to be coated. Conventional coating thicknesses range from 0.5 mm to 10 mm.

A particularly preferred application for compositions of the present invention are for treating gypsum wall board.

The hardening of the composition (e.g., as a coating) is preferably carried out at room temperature, although said hardening can also be carried out at an elevated temperature, often a slightly elevated temperature (preferably up to about 60° C.) will be sufficient, depending on the nature of the components employed.

EXAMPLES

In order to facilitate a more complete understanding of the invention, a number of Examples are provided below. However, the scope of the invention is not limited to specific embodiments disclosed in these Examples, which are for purposes of illustration only.

Example 1

25 g of aluminum hydroxide hydrate were mixed with 75 g of a 30% solids solution of ATP (triethanol amine triphosphate). A slurry was produced after mixing at room temperature for a period of five minutes. At this point, 25 g of UCAR carbon GRAF-GUARD expandable graphite was added to the mixture. The resulting mixture was stirred for three minutes to form a slurry suitable for coating onto a substrate by trowel application. The mixture was coated onto a sample of gypsum fire brick at a loading level of 50 g/sq.ft. The material was allowed to dry at room temperature over night. After 14 hours, a hard coating was observed. The coating was further dried at 70° C. in a convection oven for 15 minutes. The sample was then subjected to a high intensity gas fired compressed air fed Meker burner capable of generating temperatures >2000° F. The burner front was placed at a position 4" below a horizontally placed fire brick with the coating side down. Upon application of the heat source, the coating was observed to intumesce quickly to a height of approximately ½". Heating was continued at maximum burner temperature for a period of two hours. After two hours, the coating remained intact with the formation of a white top coat, presumably due to aluminum oxide. A control fire brick containing no coating was fired for a similar period of time.

At the end of the treatment of both samples, the samples were cooled and a comparison was made of their relative hardnesses using a penetration technique. After removal of the intumescent coating, the intumescent coated brick remained hard and penetration was extremely difficult. The control sample, after a similar heat treatment, had developed a very soft surface, which was easily crumbled on penetration. Clearly, the subject intumescent coating had provided a means of protecting the fire brick from the stand point of thermal degradation of its mechanical and physical properties.

In a second test, an expandable graphite containing intumescent system was prepared by mixing GRAF-GUARD flakes into a phosphate ester-based intumescent. The intumescent system was mixed with the GRAF-GUARD flakes in a ~2/3 to 1/3 ratio. The brick was coated at 30 g/ft$^2$ and air-dried for a period of 12 hours and further dried for 15 minutes at 70° C. The Meker test was applied. The sample, upon heating, immediately produced an intumescent coating which intumesced to a height of ~1". It was observed that under the oxidizing flame conditions of our experiment that the intumescent coating immediately began eroding after application of the heat source. After 20 minutes, the intumescent coating completely disappeared from the surface of the fire brick. After a 2-hour period of burner exposure, the sample showed a loss of mechanical strength similar to the control.

These results clearly show that the intumescent system of the present invention provides a means of extending the mechanical strength performance life of a refractory fire brick when subjected to a high intensity external heat source for an extended period of time.

Example 2

ATP was combined with aluminum hydroxide hydrate and intumescent graphite by the following procedure:

35 g of ATP (30% solution of triethanol amine triphosphate) was added to 10 g of aluminum hydroxide hydrate. 10 g of GRAF-GUARD was added and the resulting slurry was coated on a substrate. The system cured in approximately one-half hour. On subjecting to high temperature exposure (2000° F. using a Meker burner), a strong, adherent intumescent coating was produced.

This system was compared to a system prepared from aluminum hydroxide hydrate and phosphoric acid. Aluminum hydroxide hydrate and phosphoric acid form a good intumescent system, which on heating produced a ceramic foam. However, preheating the aluminum hydroxide hydrate and phosphoric acid system at 150° C. reduced the systems intumescent potential. Adding ethanolamine or triethanolamine to the above produced a low melting thermoplastic. Heating this material on the 150° C. hotplate did not produce a solid material.

On the other hand, ATP and aluminum hydroxide hydrate produced a fluid mobile system capable of combination with intumescent graphite flake to form a coating. The system hardens on standing to produce a hard coating unlike the aluminum hydroxide hydrate/phosphoric acid/ethanolamine system, which did not harden.

The ATP/aluminum hydroxide hydrate hardens to a thermoset system, which will intumesce readily when combined with expandable graphite. The aluminum hydroxide hydrate and $H_3PO_4$/triethanolamine systems in combination with expandable graphite melts to a low viscosity liquid when heated rapidly and undergoes slumping when heated on a vertical or horizontal-down surface. Also, when aluminum hydroxide hydrate is heated with orthophosphoric acid followed by heating with triethanolamine, the material first forms solid aluminum orthophosphate followed by dissolution of this solid in ethanol amine to produce a material which remains a liquid and which does not harden no matter how long it is heated on the 150° C. hot plate.

Example 3

35 g ATP, 10 g $Al(OH)_3.XH_2O$, and 10 g GRAF-GUARD were mixed and applied to (4) 6"×6"×½" Glass-Strate gypsum sheets. The sheets were fired in a horizontal-coating down position using the gas-air fired Meker burner. The results showed good tight intumescent, good adhesion to substrate without fall-off or slumping, and minimal heat transfer from burner to substrate.

Example 4

Comparative 10 g $H_3PO_4$ 5 g $Al(OH)_3.XH_2O$, 5 g water, 5 g triethanolamine, and 5 g GRAF-GUARD were mixed together (without prereacting the $H_3PO_4$ and triethanolamine) and applied to 6"×6"×½" Glass-Strate gypsum sheet and fire coatings in horizontal-down position. The result was that GRAF-GUARD expanded and sloughed off of the surface. There was insufficient thermoset binding of graphite snakes at elevated temperature to provide mechanical stability to the intumescent graphite/binder composite.

Example 5

Comparative 10 g 85% $H_3PO_4$, 3 g $Al(OH)_3.XH_2O$, 3 g triethanol amine, and 3 g GRAF GUARD were mixed. The system formed a paste. Heating on a hot plate formed an even thicker system. Spot test (spatula+Meker burner) yielded good intumescent action, but system goes through thermoplastic, runny stage.

The system was applied to 6"×6"½" gypsum sheet and dried. The system remained soft after heating 1 hour at 80° C. in convection oven. On high temperature flame front exposure in a coating side down conformation (Air/Gas Meker burner), the system began to intumesce readily. At a point where intumescence became large, the intumescent system stuffed off the horizontal-down coated board. The system never achieved a thermoset stage. It remained thermoplastic; therefore, heat from the burner melted the system and the intumescent coating separated from the substrate.

Example 6

Comparative 10 g 85% $H_3PO_4$, and 3 g $Al(OH)_3.XH_2O$ were mixed. The system became a fluid mass, which showed good intumescence on heating with a Meker burner. When the above mixture was heated on the 150° C. hot plate, water evaporated and a white solid was formed (condensed heteropoly acids). The system no longer showed intumescing action.

Example 7

Using the intumescent as an adhesive, a wood veneer skin was attached to a fire door core and a full scale door was made. One side of the door was coated with the following mixture. 48 g $H_2O$, 164 g Aerotru 23 (melamine-formaldehyde resin), 11.4 g PF resole resin, 11.4 g butanol, 5.5 g intumescent graphite (GRAF-GUARD). This was mixed and an equal amount of an amino triethyl phosphate ester in a glycol/aqueous base was added as a catalyst. The other side of the door was coated with a mixture made by mixing 100 g of melamine-formaldehyde resin and 100 g of an amino triethyl phosphate ester in a glycol/aqueous base.

These resins give the surface of the core enough strength that the cores break apart at the middle while curing the resin which makes the resin suitable to adhere the skin to the doors as an adhesive.

In the full-scale test, the door is mounted on a gas-fired furnace capable of attaining a temperature of 1700° F. in the furnace.

Using a Meker burner, several coated core bricks with the above formulation were burned in the lab. Using a thermocouple, it was determined that the resin performed in the lab tests. The Meker burner will sustain temperatures up to 1700° F. The R value of the bricks was improved.

Because of the force draft of the furnace used in the full scale door test, the Meker testing in the lab did not simulate the actual burn test next door. The organic intumescent did not last more than 30 minutes in the full-scale burn test. Therefore, after 30 minutes into the test, the performance of the door was not improved. The termocouple data of the door using organic intumescent does not differ from a control door or door without resin.

Example 8

A fire door test was conducted by applying a second intumescent coating as the veneer adhesive on both of the test door faces. The intumescent coating was composed of 33% Aluminum-based Mixture (75% Aluminum Oxide Trihydrate and 25% of Aluminum Oxide Hydrate,) 33% GRAF-GUARD, and 33% of an amino triethyl phosphate ester in a glycol/aqueous base.

The Gypsum-based door core was approximately 1.5 inches thick and covers an area of 5 feet by 3 feet as it forms a door for the test furnace one side of which is exposed to the furnace interior. The applied coating is 0.1 inches. The face veneer is 0.1 inches thick and uses the intumescent as an adhesive for attachment to the gypsum door core. The test furnace is designed to achieve a 1700° F. heat flux in the door for a duration of ninety minutes. In the post-burn test, a fire hose operated at 150 psi water pressure is directed onto the red-hot door face for a period of 45 seconds. A test "pass" is achieved if the core of the door remains intact during the water impingement.

Figure 1:
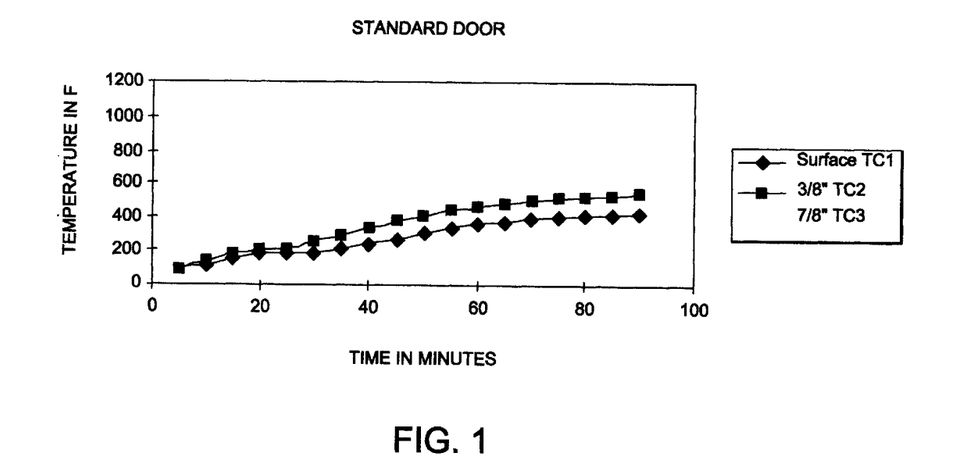
FIG. 1 shows the performance of a door in accordance with the prior art.
Figure 2:
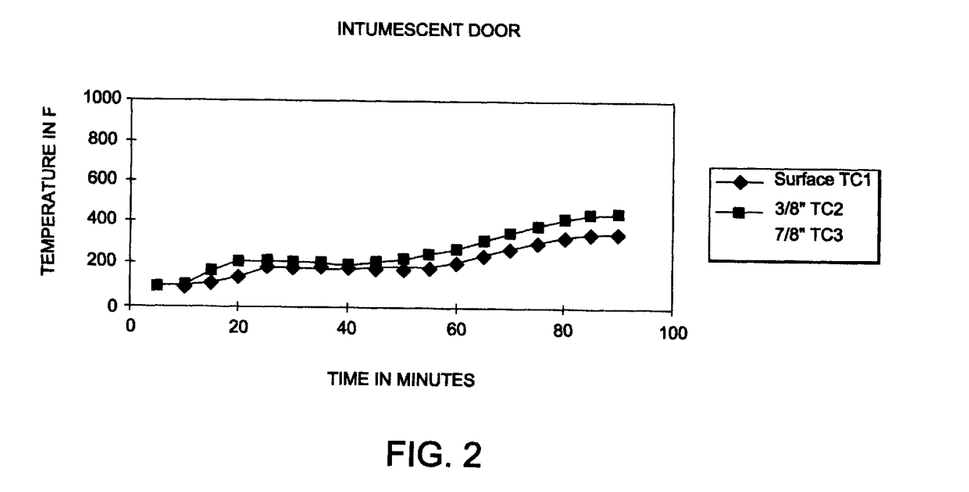
FIG. 2 shows the performance of a door in accordance with the present invention.

Four thermocouples were placed at various depths in the door, surface of the skin, $19/16$, $7/8$, and $3/8$ inches. The door was exposed to the force draft furnace with the temperature reaching over 1700° F. After five minutes, the flame exposed door skin was observed to pyrolyze and become part of the intumescent system, forming a carbonaceous front on the exfoliating intumescent adhesive. After ten minutes exposure to the flame front, a definite barrier was formed. Up to the thirty minute exposure time, the intumescent remained stable. At thirty-one minutes, moisture buildup was observed on the unexposed side of the door. After sixty minutes, steam originating from the fire door core was released at the upper edge of the unexposed side. At sixty-five minutes, at various places, the veneer was not adhering to the core on the unexposed side around the edges where heat was being released due to activation of the intumescent adhesive. After seventy-five minutes, there was expansion around the unexposed side. After ninety minutes, the barrier was still intact on the flame exposed side. This level of performance greatly exceeds the less stable adhesive described earlier. FIG. 1 shows results for five minute intervals for the standard door and FIG. 2 shows results for five minute intervals for the door treated in accordance with the present invention.

The initial intumescent coating was black in color. As it was exposed to the heat, it was observed to become red then white hot as the surface approached 1700° F. At 1700° F., surface stuffing of the coating was observed, but the undercoating of the intumescent remained intact. As a result, a definite barrier was maintained. In the fire hose and mechanical penetration tests, the core retained a good combination of inner and surface strength due to minimization of heat exposure by the intumescent barrier performance.

It will be understood that while the invention has been described in conjunction with specific embodiments thereof, the foregoing description and examples are intended to illustrate, but not limit the scope of the invention. Other aspects, advantages and modifications will be apparent to those skilled in the art to which the invention pertains, and these aspects and modifications are within the scope of the invention, which is limited only by the appended claims.

What is claimed is:

1. An intumescent composition comprising a hardened binder comprising the reaction product of an aluminum oxide or aluminum hydroxide hydrate and an organic amine phosphate, said binder containing expandable graphite flakes.

2. The composition of claim 1 wherein the aluminum oxide or aluminum hydroxide hydrate is aluminum hydroxide hydrate.

3. The composition of claim 1 wherein the organic amine phosphate is triethanolamine triphosphate.

4. The composition of claim 1 further comprising an aluminum alkoxide or chelated aluminum alkoxide.

5. The composition of claim 1 wherein the organic amine phosphate is aminotris (methylene-phosphonic acid).

6. The composition of claim 1 further comprising a solvent.

7. An aqueous composition suitable for producing a fire resistant coating on a substrate, said composition comprising a hardenable binder comprising the reaction product of an aluminum oxide or aluminum hydroxide hydrate and an organic amine phosphate, said binder containing expandable graphite flakes.

8. The composition of claim 7 wherein the aluminum oxide or aluminum hydroxide hydrate is aluminum hydroxide hydrate.

9. The composition of claim 7 wherein the organic amine phosphate is triethanolaamine triphosphate.

10. The composition of claim 7 further comprising an aluminum alkoxide or chelated aluminum alkoxide.

11. The composition of claim 7 wherein the organic amine phosphate is aminotris (methylene-phosphonic acid).

12. The composition of claim 7 further comprising a solvent.

13. A method for imparting fire resistance to a substrate comprising treating said substrate with an aqueous composition comprising a hardenable binder comprising the reaction product of an aluminum oxide or aluminum hydroxide hydrate and an organic amine phosphate, said binder containing expandable graphite flakes.

14. The method of claim 13 wherein the aluminum oxide or aluminum hydroxide hydrate is aluminum hydroxide hydrate.

15. The method of claim 13 wherein the organic amine phosphate is triethanolamine triphosphate.

16. The method of claim 13 further comprising an aluminum alkoxide or chelated aluminum alkoxide.

17. The method of claim 13 wherein the organic amine phosphate is aminotris (methylene-phosphonic acid).

18. The method of claim 13 wherein the composition further comprises a solvent.

19. A fire resistant article comprising a substrate coated with a hardened aqueous composition, said composition comprising a hardenable binder comprising the reaction product of an aluminum oxide or aluminum hydroxide hydrate and an organic amine phosphate, said binder containing expandable graphite flakes.

20. The article of claim 19 wherein the aluminum oxide or aluminum hydroxide hydrate is aluminum hydroxide hydrate.

21. The article of claim 19 wherein the organic amine phosphate is triethanolamine triphosphate.

22. The article of claim 19 further comprising an aluminum alkoxide or chelated aluminum alkoxide.

23. The article of claim 19 wherein the organic amine phosphate is aminotris (methylene-phosphonic acid).

24. The article of claim 19 wherein the composition further comprises a solvent.

* * * * *